(12) United States Patent  
Gardner (10) Patent No.: US 7,279,698 B2
(45) Date of Patent: Oct. 9, 2007

(54) SYSTEM AND METHOD FOR AN OPTICAL MODULATOR HAVING A QUANTUM WELL

(75) Inventor: Donald S. Gardner, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 10/750,522

(22) Filed: Dec. 31, 2003

(65) Prior Publication Data

US 2005/0141801 A1 Jun. 30, 2005

(51) Int. Cl.
*H01L 29/06* (2006.01)
*H01L 21/00* (2006.01)

(52) U.S. Cl. .............. 257/14; 257/18; 257/19; 257/85; 257/94; 438/46; 438/47; 438/77; 438/94

(58) Field of Classification Search ............... 257/14, 257/18, 19, 81, 85, 94; 438/32, 46, 47, 77, 438/93, 94
See application file for complete search history.

(56) References Cited

U.S. PATENT DOCUMENTS

| | | | | |
|---|---|---|---|---|
| 6,403,975 | B1 * | 6/2002 | Brunner et al. | 257/15 |
| 6,424,450 | B1 * | 7/2002 | Goossen | 359/290 |
| 6,949,761 | B2 * | 9/2005 | Chu et al. | 257/19 |
| 6,954,473 | B2 * | 10/2005 | Dehmubed et al. | 372/28 |

* cited by examiner

*Primary Examiner*—Hsien-Ming Lee
(74) *Attorney, Agent, or Firm*—Philip A. Pedigo

(57) ABSTRACT

The optical modulator may include a strained layer of SiGe to confine carriers in a quantum well. The strained layer of SiGe may be doped with arsenic to provide electrons. The optical modulator may receive an optical signal and modulate the received signal by altering the absorption coefficient of the strained layer of SiGe responsive to an electrical signal. The optical modulator device device may be suitable for use in chip-to-chip and on-chip interconnections.

19 Claims, 13 Drawing Sheets

SYSTEM AND METHOD FOR AN OPTICAL MODULATOR HAVING A QUANTUM WELL

TECHNICAL FIELD

Embodiments of the invention generally relate to the field of optical modulators and, more particularly, to a system and method for an optical modulator having a quantum well.

BACKGROUND

Modem computing devices include a variety of different types of integrated circuit (IC) chips including processors, memory devices, and controllers. On-chip and chip-to-chip interconnections within a computer are typically made with metal wires. As IC chips become more integrated, the wires become narrower and more closely spaced. This results in a higher resistance in the wires and a higher capacitance between the wires. The increase in resistance and capacitance may degrade electrical signals traveling through the wires. This signal degradation may reduce the performance of IC chips and the computing device as a whole.

To solve this problem, on-chip and chip-to-chip optical interconnections using light sources and waveguides have been proposed. In an optical interconnection system, an electrical signal from the IC chip is converted to an optical signal emitted by a light source. The light then travels over a waveguide to a detector, which converts the received light back to an electrical signal. The speed of the light in an optical interconnection is faster than the flow of electrons in a wire and scales linearly with the length of the optical interconnection. Also, optical interconnections can consume less electrical power than electrical interconnections as the interconnections become long.

Conventional optical interconnection systems generally produce light with an off-chip light source such as a Vertical Cavity Surface Emitting Laser (VCSEL). In such systems, the off-chip light source is normally directly modulated (e.g., via a switch) to superimpose information onto the light emitted by the light source. In addition, off-chip light sources are, typically, separately packaged and aligned to the waveguide, as well as to other devices on the IC chip. This makes for a relatively expensive and complicated on-chip or chip-to-chip optical communication system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for an optical modulator having quantum wells. Embodiments of the invention may consist of an optical modulator formed on a silicon substrate normally used for complementary metal-oxide semiconductor (CMOS) digital circuit technology. These embodiments may be used to modulate light traveling, for example, through an optical waveguide formed on the silicon substrate.

A number of elements and compounds are referred to throughout this document. It is recognized that there is some variance in the symbols and names used to identify elements and compounds. Table 1 provides a list of elements, the corresponding atomic numbers for the listed elements, and the abbreviation used throughout this document for the identified element.

TABLE 1

| Element Name | Atomic Number (Z) | Abbreviation |
|---|---|---|
| Silicon | 14 | Si |
| Germanium | 32 | Ge |
| Arsenic | 33 | As |

Figure 1:
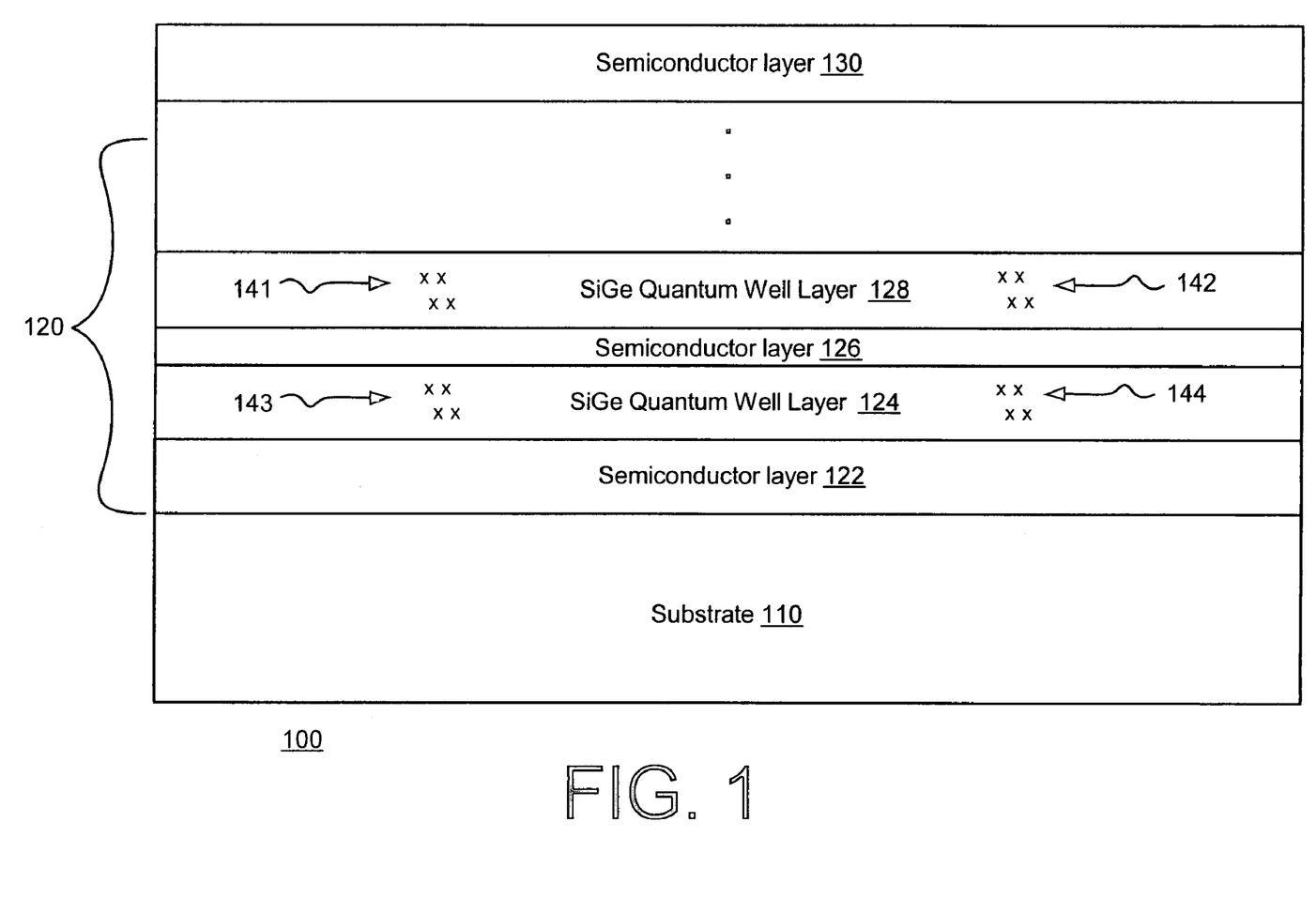
FIG. 1 illustrates optical modulator device 100 implemented according to an embodiment of the invention.

FIG. 1 illustrates selected elements of optical modulator device 100, according to an embodiment of the invention. The illustrated embodiment of optical modulator device 100 includes substrate 110, optically active layer 120, and semiconductor layer 130. The term "substrate" refers to the base layer of a structure such as an Integrated Circuit (IC). Substrate 110 is formed from a semiconductor material. In an embodiment, substrate 110 is formed from silicon. In an alternative embodiment, substrate 110 is formed from germanium. In yet another alternative embodiment substrate 110 is formed from SiGe.

The term "optically active" refers to the processing of optical signals. The term "optical" is not limited to photons that are part of the visible spectrum but includes, for example, photons in the infrared and ultraviolet regions. A "layer" refers to one or more thin-films deposited onto a substrate. Thus, optically active layer 120 refers to a layer of optical modulator device 100 that processes optical signals.

In an embodiment optically active layer 120 includes semiconductor layer 122 and SiGe quantum well layer 124. Semiconductor layer 122 may be formed from, for example, silicon. Semiconductor materials such as silicon and SiGe have a regular geometrical arrangement of atoms called a crystal lattice. The term "lattice constant" refers to the distance between atoms in a crystal lattice.

In an embodiment, SiGe quantum well layer 124 is epitaxially grown on, for example, semiconductor layer 122. In such an embodiment, the lattice constant of SiGe quantum well layer 124 is different than the lattice constant of semiconductor layer 122. The difference in lattice constant between the layers creates a strain (e.g., either biaxial compressive strain or tension) in SiGe quantum well layer 124. Thus, SiGe quantum well layer 124 may be referred to as a strained layer. The degree of strain in $Si_{1-x}Ge_x$ quantum well layer 124 may vary as the ratio of germanium to silicon in the layer varies.

A "quantum well" refers to a thin (e.g., 10 nm) layer (or region) having a relatively small bandgap that is sandwiched between two layers that have a larger bandgap and showing "type I" band line-up (e.g., with the energy "minimum" for electrons and holes occurring in the narrower-bandgap semiconductor). The term "bandgap" refers the difference between the conduction band energy level and the valance band energy level at a given point in a material. Charge carriers (e.g., electrons and/or holes) may be "trapped" in a quantum well because of the larger bandgap of the layers that sandwich the quantum well. In an embodiment, semiconductor layers 122 and 126 have a larger bandgap than SiGe quantum well layer 124. Thus, SiGe quantum well layer 124 may be referred to as a "quantum well layer" because it is sandwiched between layers that have a larger bandgap. Quantum wells are further discussed below with reference to FIG. 2.

As mentioned above, the strain in SiGe quantum well layer 124 may be varied as a function of the ratio of germanium to silicon in the layer. As is further discussed below, the bandgap of SiGe quantum well layer 124 varies as a function of its strain and as a function of the Ge concentration. Thus, in an embodiment, straining SiGe quantum well layer 124 enhances the "trapping" of charge carriers in the layer. In an embodiment, most of the change in bandgap appears as a change in the valance band energy level. Strained quantum well layers are further discussed below with reference to FIG. 3.

As is further discussed below, a change in valance band energy is useful for confining holes but not for confining electrons. In an embodiment a dopant (e.g., the dopant(s) illustrated by reference numerals 141-144) is added to SiGe quantum well layers 124 and 128 to compensate for the minimal quantum confinement of electrons. In an embodiment, quantum well layers 124 and 128 are heavily doped with arsenic (e.g., $2.5 \times 10^{19}$ atoms/cm$^3$ arsenic). In such an embodiment, the arsenic atoms provide electrons in quantum well layers 124 and 128. In an alternative embodiment, a different dopant, or combination of dopants, may be used (e.g., phosphorus and/or antimony).

In an embodiment, optically active layer 120 may include two (or more) SiGe quantum well layers to provide, for example, a dual quantum well structure in the optically active layer. In an embodiment, multiple SiGe quantum well layers may provide improved contrast over embodiments that have just one (or comparatively fewer) SiGe quantum well layer. Such an advantage, however, may be counterbalanced by the added processing that is required to form the multiple SiGe quantum well layers. The illustrated embodiment of optically active layer 120 illustrates this dual quantum well structure with SiGe quantum well layers 124 and 128. Some of the advantages of a dual quantum well structure are discussed below with reference to FIGS. 4 and 5.

Figure 2:
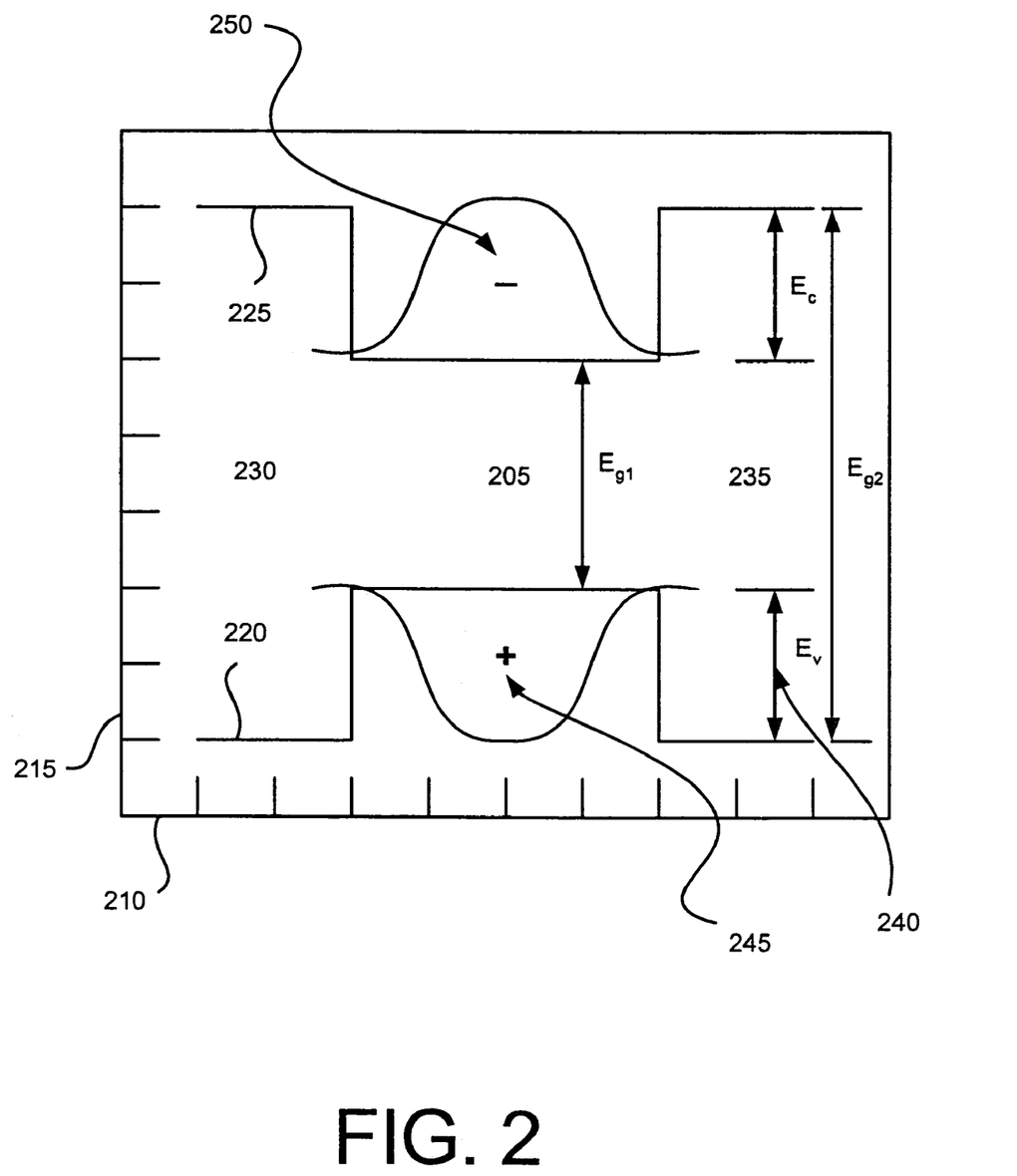
FIG. 2 is a graphical illustration of a layer of SiGe providing a quantum well according to an embodiment of the invention.

FIG. 2 is a graphical illustration of a strained layer of SiGe 205 providing a quantum well according to an embodiment of the invention. Horizontal axis 210 represents displacement, for example, within an optical modulator device and vertical axis 215 represents energy level (e.g., the energy level of valance band 220 and conduction band 225). In an embodiment, SiGe quantum well layer 205 is deposited between silicon layers 230 and 235. In such an embodiment, SiGe quantum well layer 205 may be epitaxially grown on one of silicon layers 230 and 235 so that it is strained.

The bandgap of SiGe quantum well layer 205 is a function both of the fraction of germanium in the layer and the strain of the layer. The change in bandgap of SiGe quantum well layer 205 is largely exhibited in valance band 220 as illustrated by reference numeral 240. This change in bandgap of SiGe quantum well layer 205 provides confinement of holes as illustrated by reference numeral 245. In an embodiment, SiGe quantum well layer 205 is doped with, for example, arsenic atoms. The arsenic atoms provide electrons in the region of the quantum well as illustrated by reference numeral 250.

In the absence of an electric field, electrons 250 are localized within the region of SiGe quantum well layer 205 and there is overlap between electrons 250 (or, more precisely, electron wave functions) and holes 245 (or, more precisely, hole wave functions). If an electric field is applied to SiGe quantum well layer 205, however, valance band 220 and conduction band 225 "bend" in response to the applied field. As valance band 220 and conduction band 225 bend, a fraction of electrons 250 move outside of SiGe quantum well layer 205. As the electrons (or electron wave functions) move outside of SiGe quantum well layer 205, there are fewer re-combinations of holes with electrons. The ability of SiGe quantum well layer 205 to absorb light is (approximately) proportional to the magnitude of re-combinations between holes and electrons occurring in the layer. In other words, the absorption coefficient of SiGe quantum well layer 205 decreases as a fraction of electrons 250 move outside of the layer. Thus, an optical signal traveling through SiGe quantum well layer 205 can be modulated by applying an electric field to SiGe quantum well layer 205.

Figure 3:
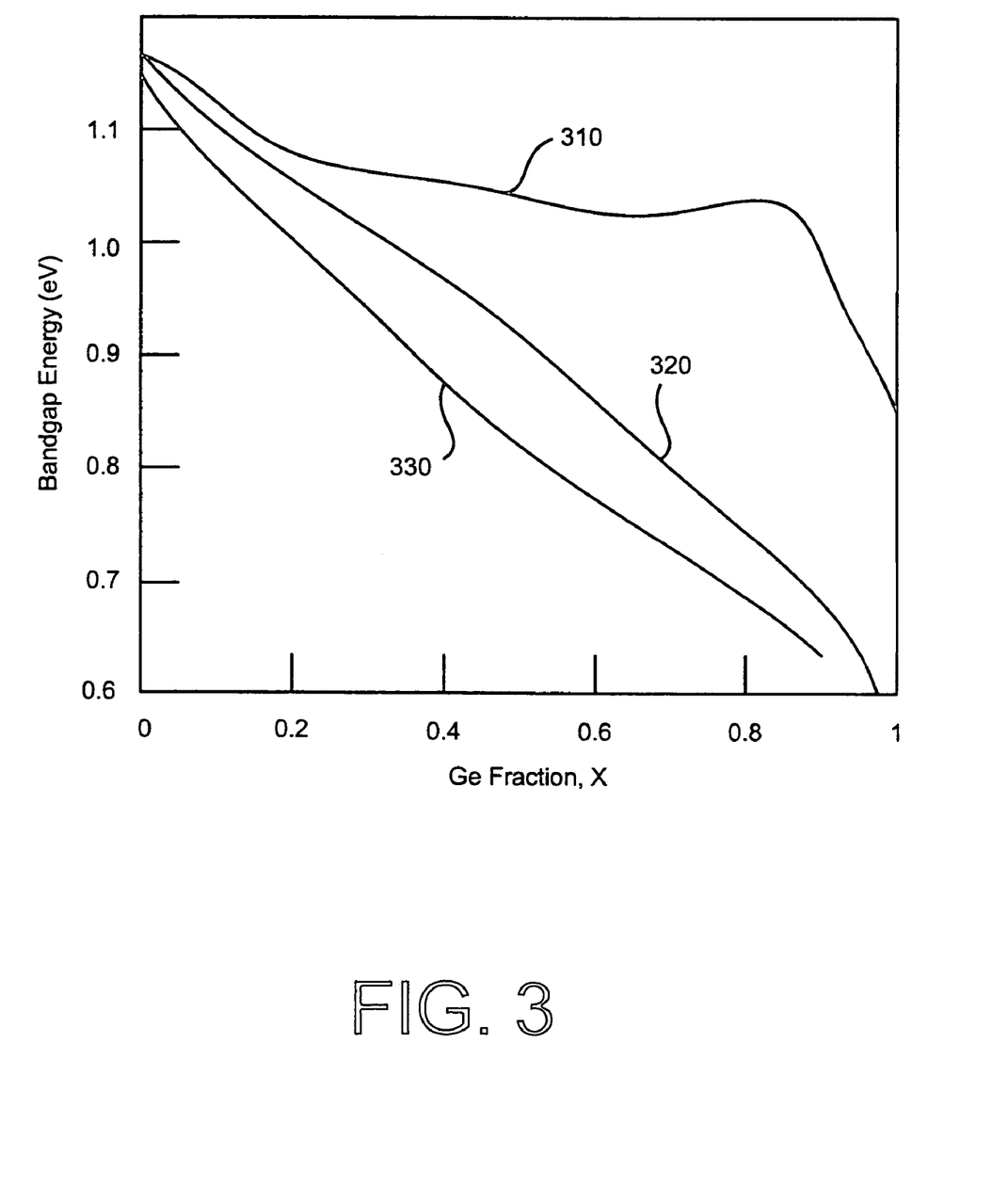
FIG. 3 is a graphical illustration of the dependence of $Si_{1-x}Ge_x$ bandgap energy on fraction of germanium and strain.

FIG. 3 is a graphical illustration of the dependence of $Si_{1-x}Ge_x$ bandgap energy on fraction of germanium and strain. The relationship between bandgap energy, fraction of germanium, and strain is shown for bulk relaxed $Si_{1-x}Ge_x$ 310, Si on $Si_{1-x}Ge_x$ 320, and $Si_{1-x}Ge_x$ on Si 330. The term "Si on $Si_{1-x}Ge_x$" refers to a layer of Si deposited on a layer (or substrate) of $Si_{1-x}Ge_x$. Similarly, "$Si_{1-x}Ge_x$ on Si" refers to a layer of $Si_{1-x}Ge_x$ deposited on a layer (or substrate) of Si. The composition of a silicon germanium alloy, $Si_{1-x}Ge_x$ may be varied over the entire range of germanium fraction (e.g., from x=0 to x=1) because germanium is infinitely soluble in silicon. As shown in FIG. 3, the bandgap for a strained layer of $Si_{1-x}Ge_x$ on Si 330 (and also Si on $Si_{1-x}Ge_x$ 320) is generally inversely proportional to the fraction of germanium in the $Si_{1-x}Ge_x$ alloy.

Figure 4:
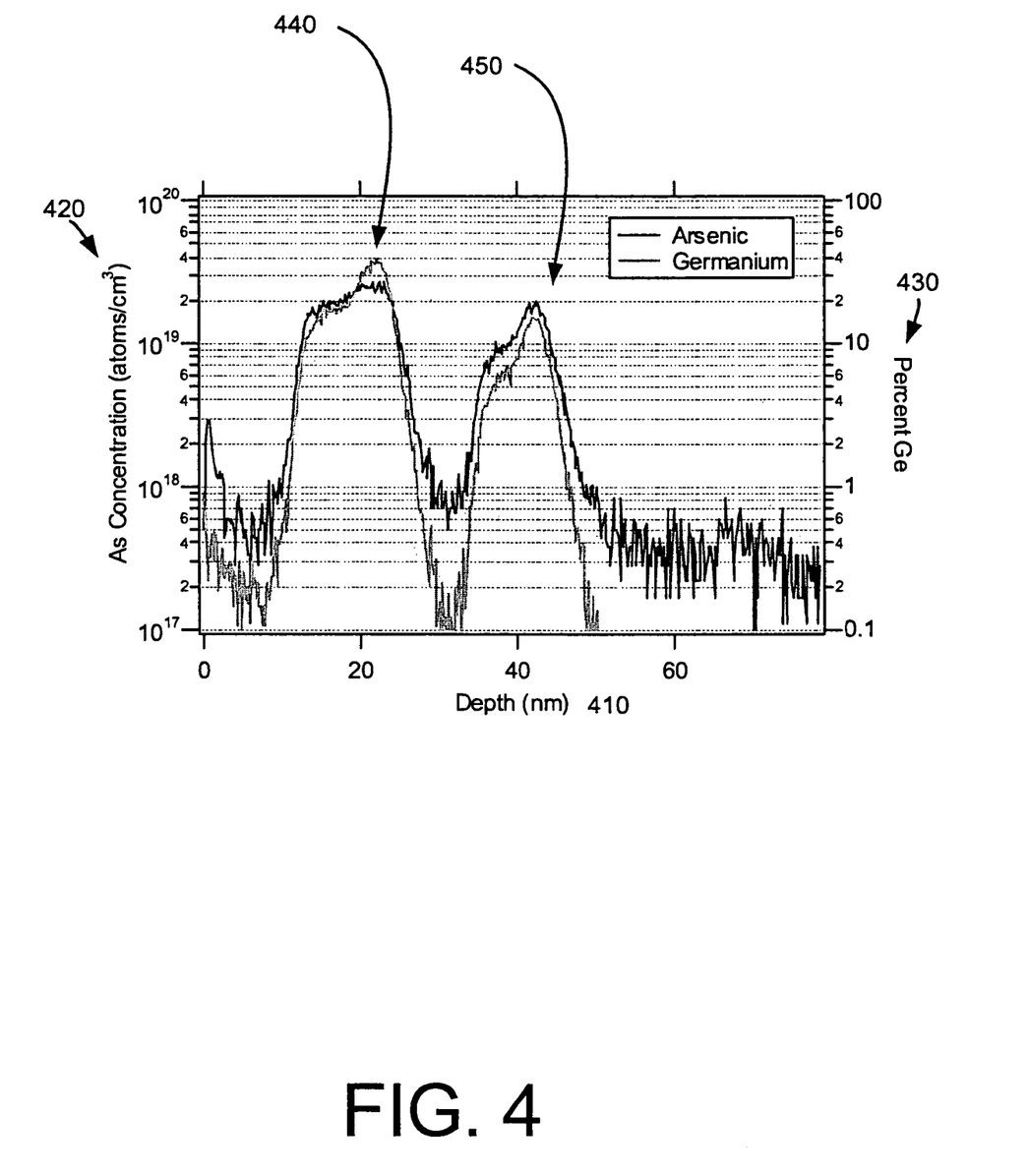
FIG. 4 is a logarithmic graph illustrating selected aspects of a dual quantum well structure implemented in accordance with an embodiment of the invention.

FIG. 4 illustrates a Secondary Ion Mass Spectrometer (SIMS) measurement of an arsenic-doped SiGe quantum well layer having a dual quantum well structure, according to an embodiment of the invention. A "SIMS measurement" refers to a type of compositional analysis for small samples. Horizontal axis 410 measures a depth into the arsenic-doped SiGe quantum well layer. Left vertical axis 420 measures the concentration of arsenic atoms (as a function of depth) in the layer and right vertical axis 430 measures the percent of germanium (as a function of depth) in the layer. Quantum well 440 is a strained layer of SiGe that is approximately 27% germanium. Quantum well 450 is a strained layer of SiGe that is approximately 10% germanium. In the illustrated embodiment, quantum wells 440 and 450 are doped with approximately $2.5 \times 10^{19}$ atoms/cm$^3$ of arsenic.

Figure 5:
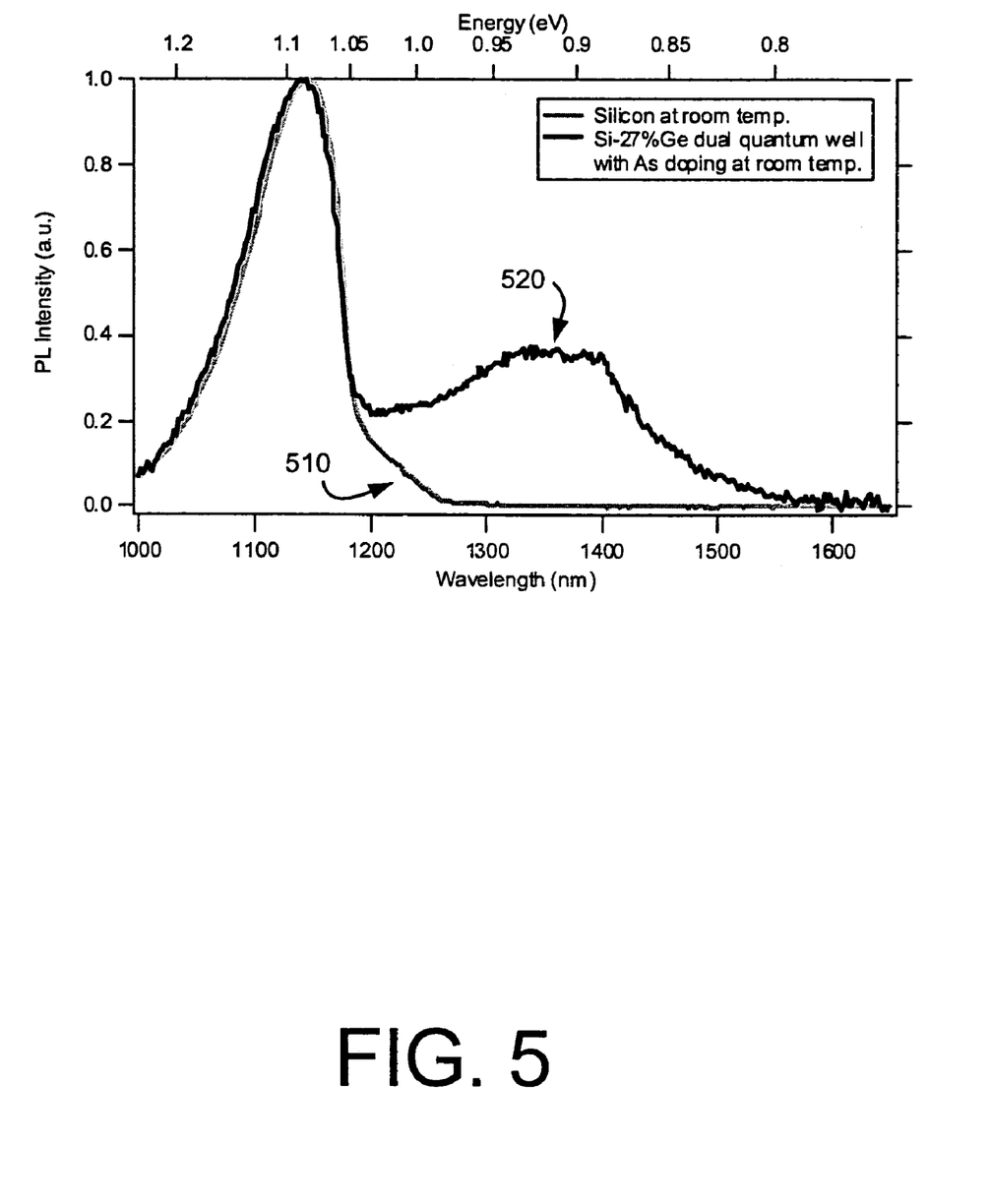
FIG. 5 is a graphical illustration of photoluminescence from a silicon substrate and a dual arsenic-doped SiGe quantum well structure implemented according to an embodiment of the invention.

FIG. 5 is a graphical illustration of photoluminescence measurements for the arsenic-doped SiGe quantum well layer shown in FIG. 4. In the illustrated embodiment, the arsenic-doped SiGe quantum well layer is deposited on a Si substrate. As shown by reference numeral 510, the silicon substrate does not emit light that has a wavelength greater than 1250 nm. Reference numeral 520, however, illustrates that the arsenic-doped SiGe quantum layer emits light in the spectral range of approximately 1300 nm to 1400 nm. Moreover, these emissions are present when the device is at room temperature. Thus, the illustrated embodiment of the invention is suitable for modulating light at room temperature.

Figure 6:
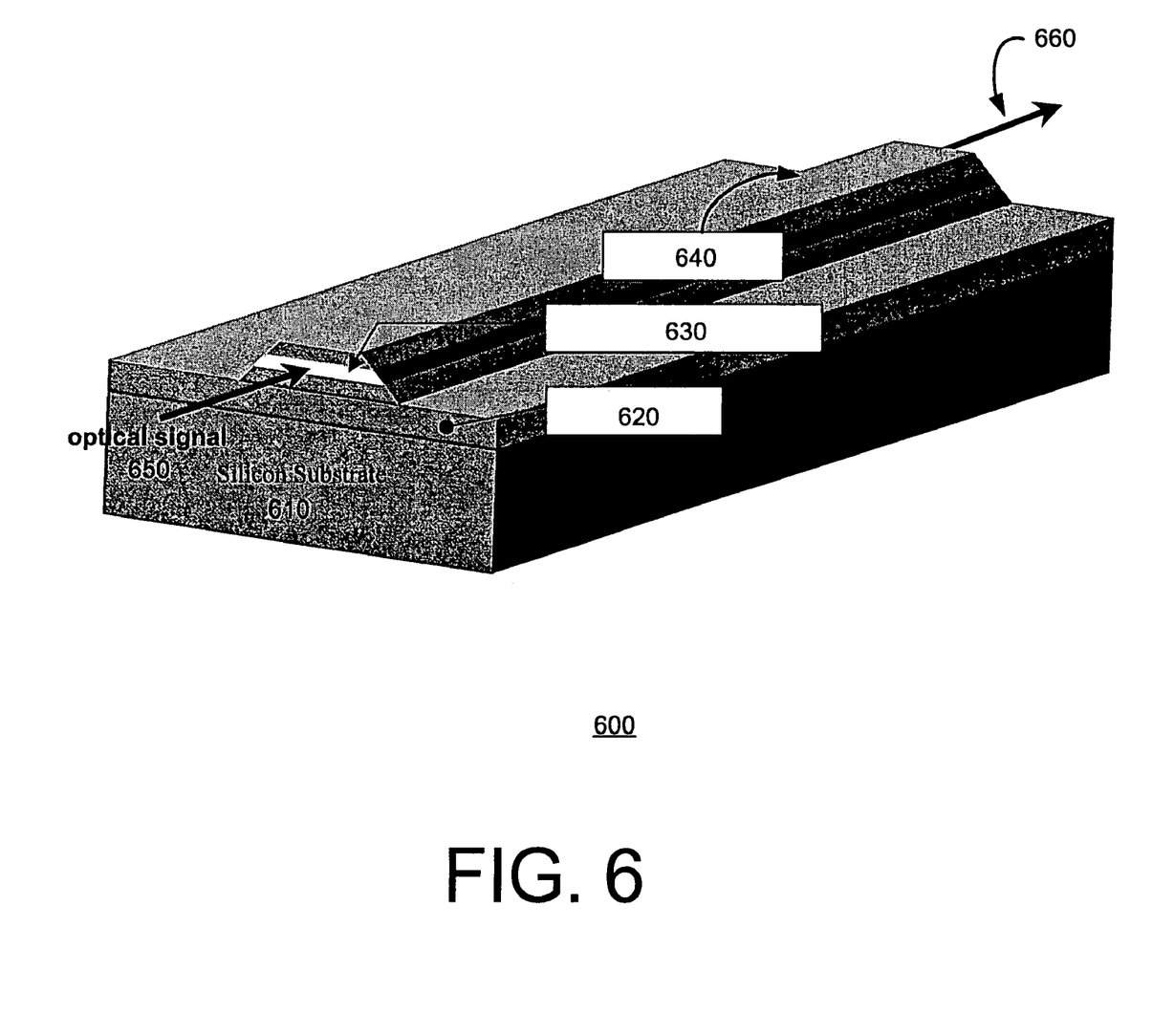
FIG. 6 is a plan view of selected aspects of optical waveguide modulator 600, according to an embodiment of the invention.

FIG. 6 is a plan view of selected aspects of optical waveguide modulator 600, according to an embodiment of the invention. Optical waveguide modulator 600 includes substrate 610, semiconductor layer 620, strained SiGe quantum well layer 630, and semiconductor layer 640. In the illustrated embodiment, substrate 610 is formed from silicon. In an alternative embodiment, substrate 610 is formed from a different material (e.g., germanium or SiGe). In an embodiment, semiconductor layers 620 and 640 are formed from silicon. In such an embodiment, strained SiGe quantum well layer 630 is epitaxially grown on semiconductor layer 620.

In an embodiment, a light source (not shown) such as a laser or light-emitting diode directs optical signal 650 to an end of optical waveguide modulator 600. In an embodiment, the light source is integrated onto the same IC chip as optical waveguide modulator 600. In an alternative embodiment, the light source is an off-chip light source such as a Vertical Cavity Surface Emitting Laser (VCSEL). Optical signal 650 may be any of a wide variety of signals in the infrared, visible, and ultraviolet bands. As is further discussed below, with reference to FIG. 8, in an embodiment an electric field is applied to optical waveguide modulator 600 as optical signal 650 travels through it. In such an embodiment, the electric field alters the optical absorption coefficient of strained SiGe quantum well layer 630. The fraction of optical signal 650 that is absorbed by the SiGe quantum well layer 630 varies as the optical absorption coefficient of the layer varies. Thus, output signal 660 is formed by modulating optical 650 with an electric field applied to optical waveguide modulator 600.

Figure 7:
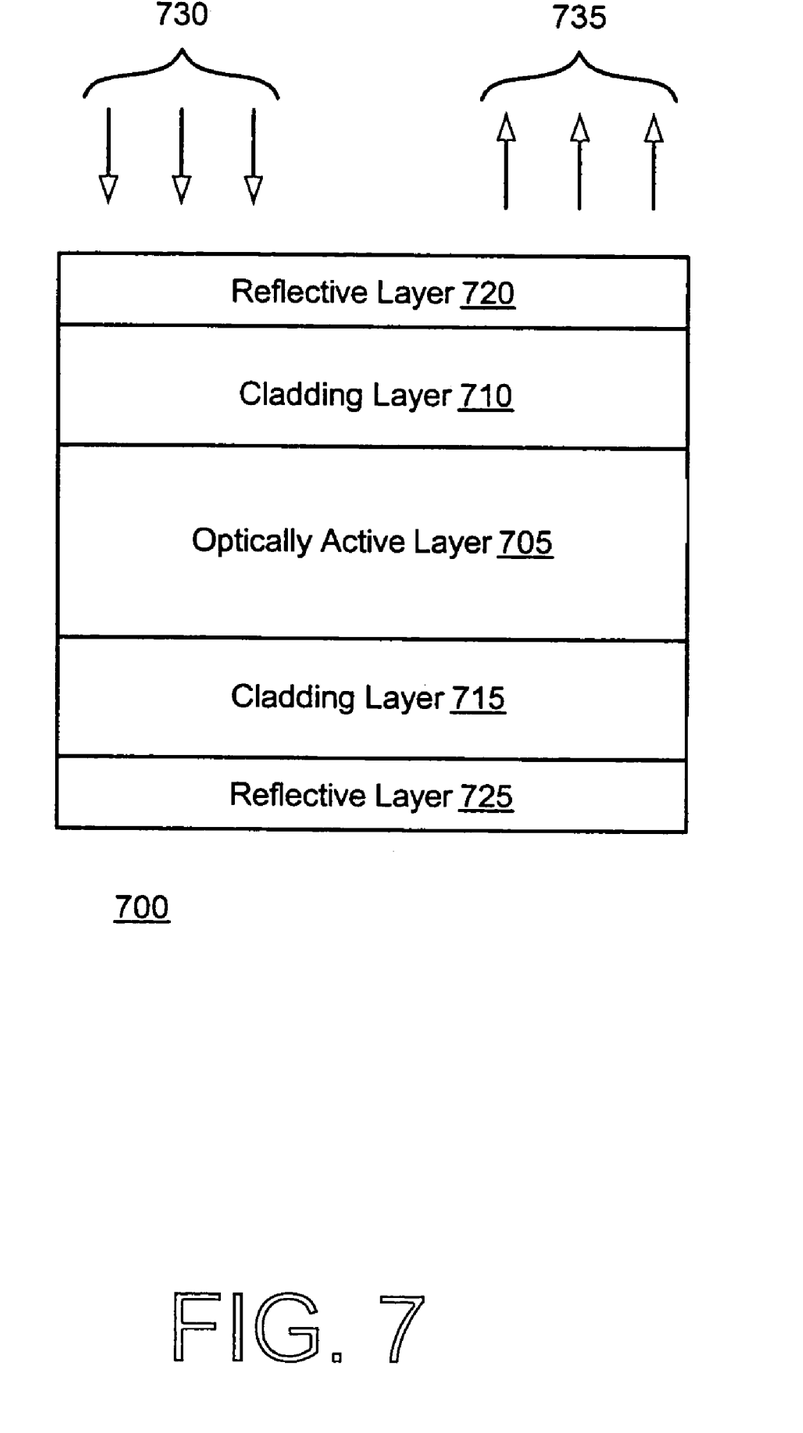
FIG. 7 is a is block diagram of selected aspects of optical modulator 700 having a resonant cavity created using two reflectors and a SiGe layer according to an embodiment of the invention.

FIG. 7 is a block diagram of selected aspects of optical modulator 700, according to an alternative embodiment of the invention. Optical modulator 700 includes optically active layer 705, cladding layers 710 and 715, and reflective layers 720 and 725. In an embodiment, optically active layer 705 includes one or more strained SiGe quantum well layers (e.g., optically active layer 120, shown in FIG. 1). A "cladding layer" refers to a layer having a lower index of refraction than optically active layer 705. In an embodiment, reflective layers 720 and 725 may be formed from a semiconductor material or a dielectric material.

In an embodiment, a light source (not shown) couples optical signal 730 into optical modulator 700. An electric field may be applied to optically active layer 705 as optical signal 730 travels through optical modulator 700. The electric field alters the optical absorption coefficient of optically active layer 705 and thereby modulates optical signal 730. The modulated signal emerges from optical modulator 700 at reference numeral 735.

Figure 8:
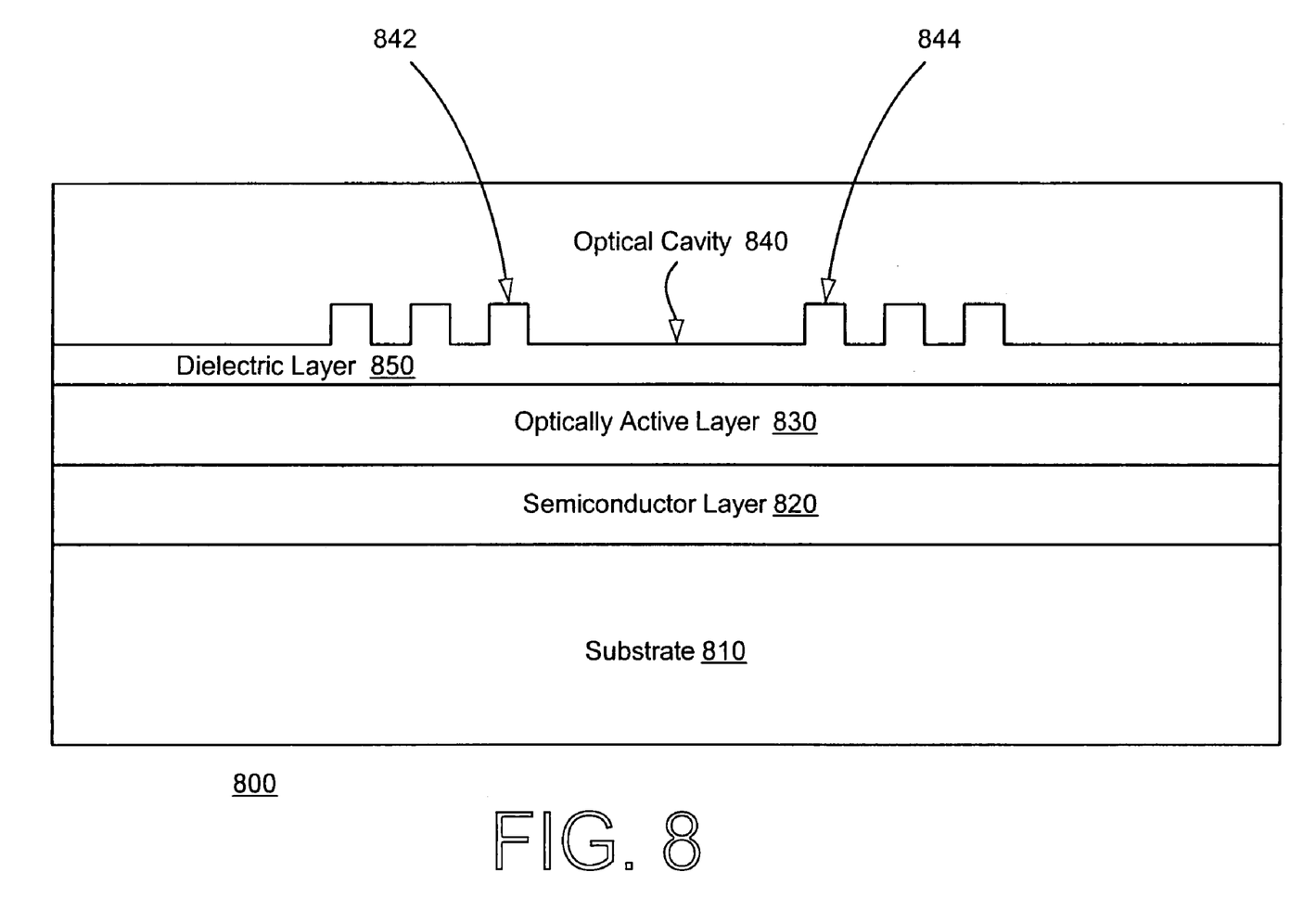
FIG. 8 is an illustration of optical modulator device 800 implemented with an optical cavity according to an embodiment of the invention.

FIG. 8 is an illustration of optical modulator device 800 implemented with an optical cavity according to another alternative embodiment of the invention. Optical modulator device 800 includes substrate 810, semiconductor layer 820, optically active layer 830, and optical cavity 840. In an embodiment, substrate 810, semiconductor layer 820, and optically active layer 830 are substantially the same as the similarly named elements shown in FIG. 1.

Optical cavity 840 provides a means to enhance the light emitted from optically active layer 830. The term "optical cavity" refers to a cavity that confines and amplifies light. This can be done by, for example, enclosing optically active region 830 with reflective surfaces to (at least partially) contain oscillating electromagnetic fields. In the embodiment illustrated in FIG. 8, optical cavity 840 is formed by creating a ridge waveguide structure in dielectric layer 850 (and/or optically active layer 830) with a distributed Bragg grating at each end of the waveguide. A "dielectric layer" broadly refers to a thin-film that is deposited to provide electrical insulation. In an embodiment of the invention, dielectric layer 850 is composed of SiO$_2$. In alternative embodiments of the invention, dielectric layer 850 may be composed of a different material. The distributed Bragg reflector structure may be etched using lithography and dry etching techniques into dielectric layer 850 (and/or optically active layer 830).

In an embodiment of the invention, optically active layer 830 emits light having a wavelength λ. Grating teeth 842 and 844 may form a Bragg reflector by being spaced with a period of λ/2, in an embodiment of the invention. A "distributed Bragg reflector" refers to a waveguide section that provides constructive interference of radiation that is backscattered from the reflecting surfaces. Bragg reflectors are well known to those of ordinary skill in the art and will not be further described except as to how they relate to embodiments of the invention.

Figure 9:
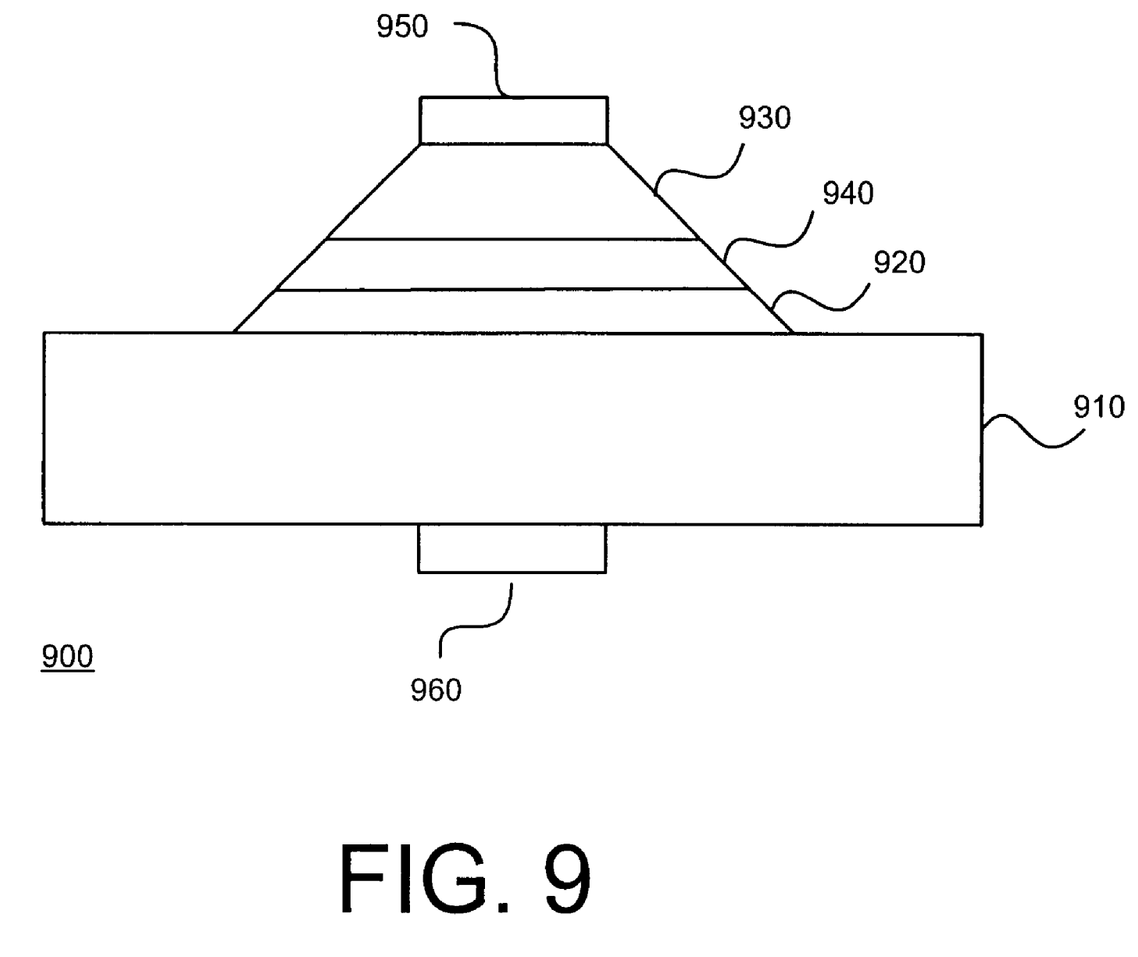
FIG. 9 is an illustration of optical modulator device 900, implemented according to an embodiment of the invention employing electrical excitation.

FIG. 9 is an illustration of optical modulator device 900, implemented according to an embodiment of the invention employing electrical excitation. Optical modulator device 900 includes substrate 910, semiconductor layers 920 and 930, and optically active layer 940, in an embodiment of the invention. In addition, optical modulator device 900 includes electrical contacts 950 and 960. Electrical contacts 950 and 960 are used to apply an electric field to optically active layer 940, in an embodiment of the invention. For example, an electrical signal may be coupled to optical modulator device 900 using electrical contacts 950 and 960. The electrical signal may alter the optical absorption coefficient of one or more strained SiGe quantum well layers within optically active layer 940 causing them to modulate an optical signal passing through optical modulator device 900. The modulated optical signal may travel through optically active layer 940 in a direction that is perpendicular to the perspective of optical modulator device 900 that is shown in FIG. 9.

Figure 10:
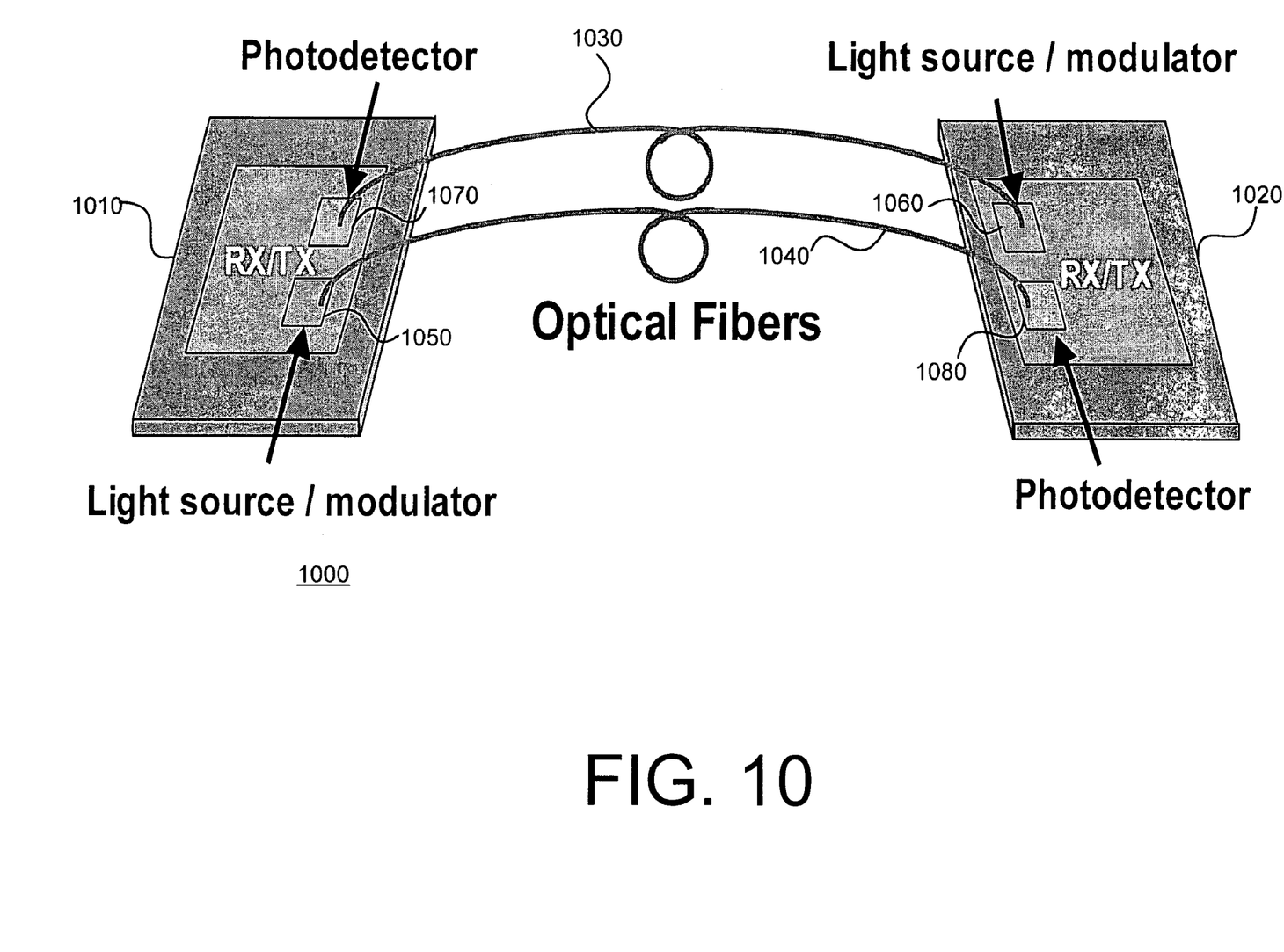
FIG. 10 is a plan view of selected elements of chip-to-chip communication system 1000, implemented according to an embodiment of the invention.

FIG. 10 is a plan view of selected elements of chip-to-chip communication system 1000, implemented according to an embodiment of the invention. Chip-to-chip communication system 1000 includes IC chips 1010 and 1020, optical fibers 1030 and 1040, optical modulators (and/or light sources) 1050 and 1060, as well as photodetectors 1070 and 1080. Photodetectors 1070 and 1080 represent a broad range of devices that detect incoming light and, in some cases, convert the detected light into electrical signals. Optical fibers and photodetectors are well known by those of ordinary skill in the art and will not be further described except as to how they relate to embodiments of the invention. While the illustrated embodiment shows optical fibers connecting IC chip 1010 and IC chip 1020, a person of ordinary skill in the art will appreciate that a wide range of optical pathways may be used to couple light between the chips. In addition, other optical elements besides photodetectors may be used. Modulators (and/or light sources) 1050 and 1060 may include a structure substantially similar to optical modulator device 100, shown in FIG. 1, in an embodiment of the invention. In an embodiment of the invention, modulators 1050 and 1060 are each integrated with a light source (e.g., a Light Emitting Diode (LED) or a laser). In an alternative embodiment of the invention, the light sources are separate from modulators 1050 and 1060 (e.g., off-chip light sources).

IC chip 1010 may couple an optical signal to optical modulator (and/or light source) 1050 using an optical source (e.g., an LED). The optical signal may be modulated with an electric field so that the modulated light conveys digital or analog information from IC chip 1010. The modulated light may be coupled to optical fiber 1040. Optical fiber 1040 transports the modulated light to photodetector 1080. Photodetector 1080 converts the modulated light into an electrical signal for use by IC chip 1020, in an embodiment of the invention.

Figure 11:
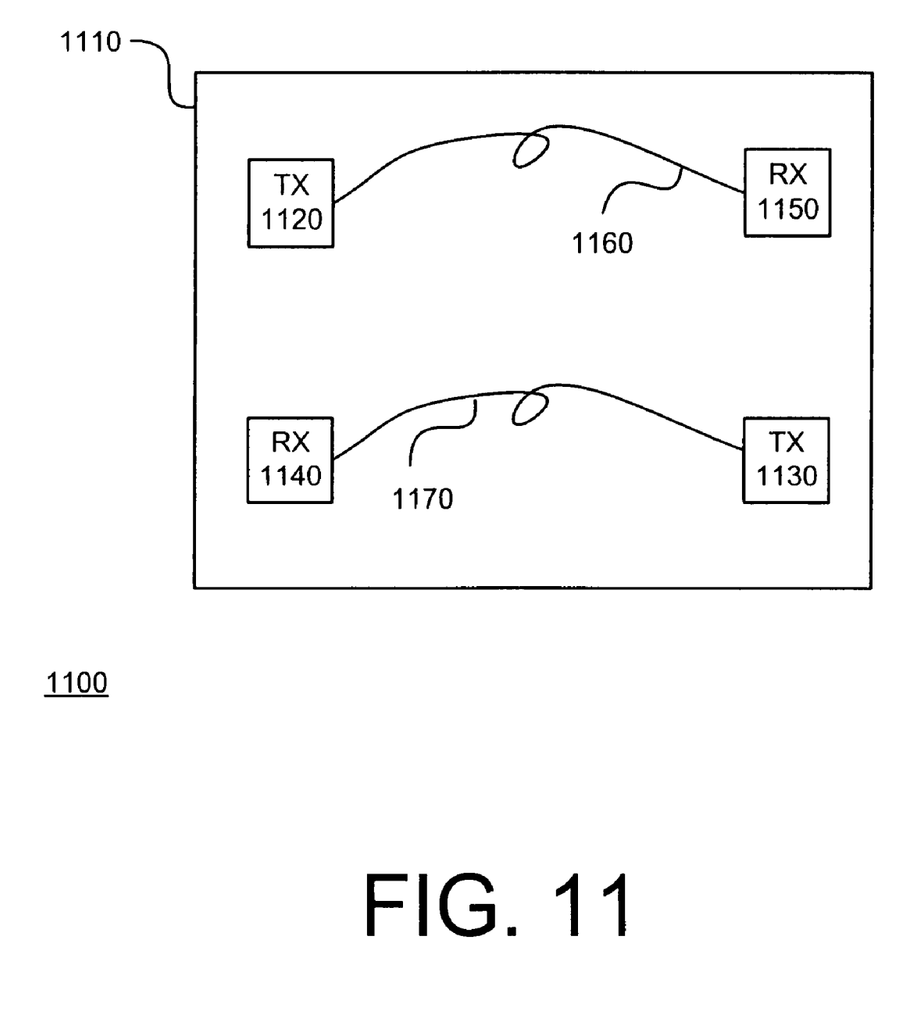
FIG. 11 is a block diagram of on-chip communication system 1100, implemented according to an embodiment of the invention.

FIG. 11 is a block diagram of on-chip communication system 1100, implemented according to an embodiment of the invention. On-chip communication system 1100 includes IC chip 1110 with optical modulating devices 1120 and 1130 fabricated on the same substrate as other elements of IC chip 11 10. In an embodiment of the invention, optical modulating devices 1120 and 1130 may each include an optically active layer having one or more strained SiGe quantum well layers (e.g., SiGe quantum well layer 128, shown in FIG. 1).

Optical modulator devices 1120 and 1130 are, respectively, in optical communication with photodetectors 1150 and 1140 via optical pathways 1160 and 1170. In an embodiment of the invention, optical pathways 1160 and 1170 are optical fibers. In alternative embodiments of the invention, optical pathways 1160 and 1170 are optical waveguides that are fabricated on the same substrate as IC chip 1110.

IC chip 1110 transports digital and/or analog encoded information via communication system 1100. In one embodiment of the invention, an optical signal is provided to optical modulator device 1120 from an on-chip light source (e.g., a low cost LED). Optical modulator device 1120 modulates the provided signal in response to an electric field. The modulated light is then transported to photodetector 1150 via optical pathway 1160. In an embodiment of the invention, photodetector 1150 converts the modulated light to an electrical signal for further processing by IC chip 1110.

Figure 12:
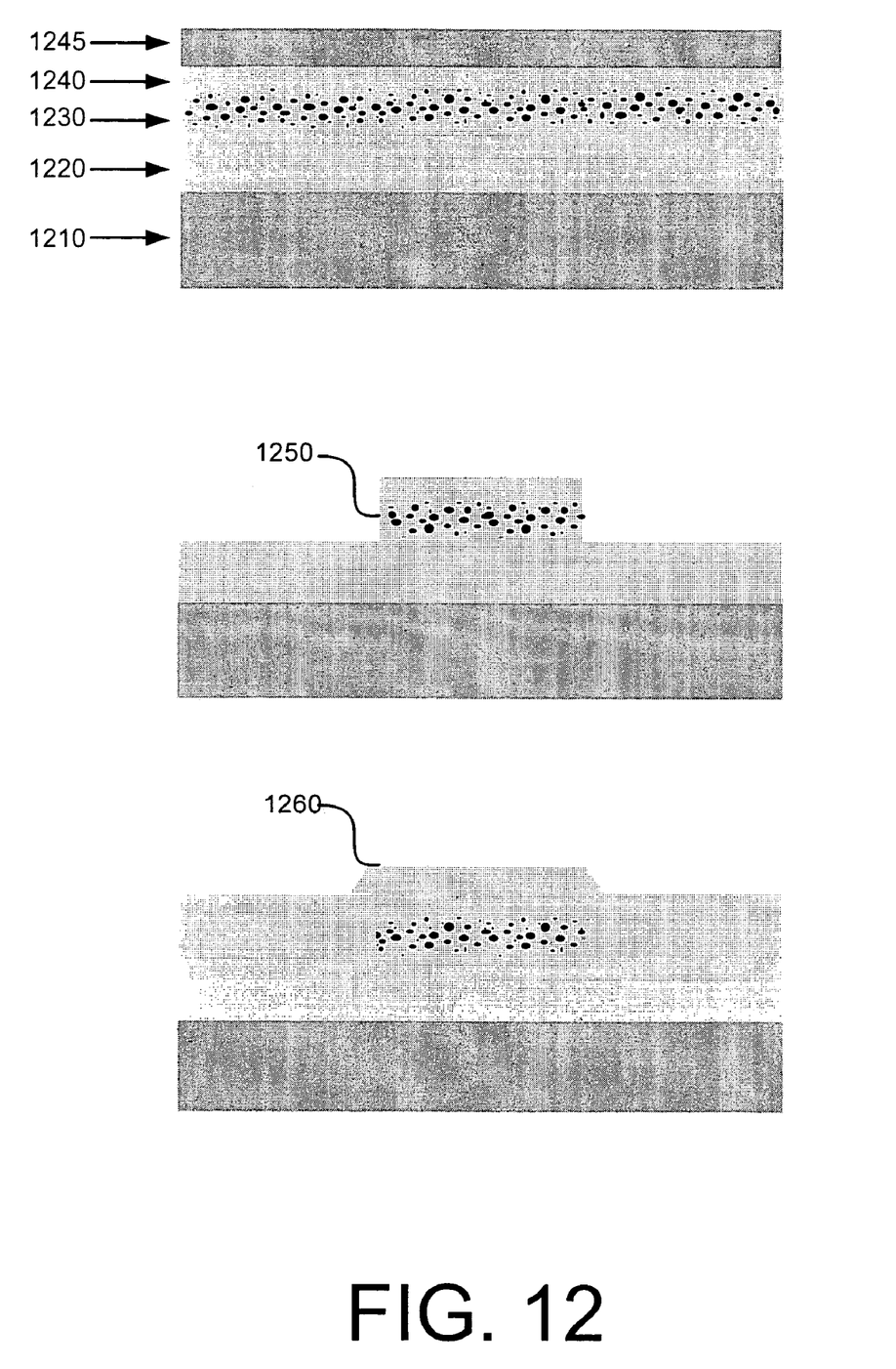
FIG. 12 illustrates the fabrication of a waveguide (including an optically active layer), according to an embodiment of the invention.

FIG. 12 illustrates the fabrication of a waveguide (including an optically active layer), according to an embodiment of the invention. Dielectric layer 1220 is deposited on an upper surface of substrate 1210, in an embodiment of the invention. In an embodiment of the invention, substrate 1210 is formed from silicon or germanium. Dielectric layer 1220 may be formed from, for example, $SiO_2$, SiN, SiON, or $AlSiO_x$. Dielectric layer 1220 may be deposited by standard complementary metal-oxide semiconductor (CMOS) techniques such as chemical vapor deposition (CVD), thermal oxidation, and/or sputter deposition.

Optically active layer 1230 may be formed by depositing a thin layer of $Si_{1-x}Ge_x$ on an upper surface of dielectric layer 1220. In an embodiment of the invention, Molecular-Beam Epitaxy (MBE) or ion implantation techniques are used to deposit optically active layer 1230. The source for silicon atoms and germanium atoms may be either a gas source or a solid source. In an embodiment, a layer of $Si_{1-x}Ge_x$ is deposited and annealed to form nanocrystals. In an embodiment, optically active layer 1230 is doped with, for example, arsenic. In such an embodiment, the source of arsenic may be a solid source or a gas source.

In the illustrated embodiment, dielectric layer 1240 is deposited on an upper surface of optically active layer 1230. Dielectric layer 1240 may be formed from, for example, $Sio_2$, SiN, SiON, or $AlSiO_x$. Dielectric layer 1240 may be deposited by standard complementary metal-oxide semiconductor (CMOS) techniques such as chemical vapor deposition (CVD), thermal oxidation, or sputtering, in an embodiment of the invention.

In an embodiment of the invention, conductive layer (or layers) 1245 is deposited on an upper surface of dielectric layer 1240. In such an embodiment of the invention, an electric connection may be applied to waveguide 1250 through conductive layer 1245 to modulate the device. In one embodiment of the invention, conductive layer 1245 is formed from polysilicon. In an alternative embodiment of the invention, a different material may be used to form conductive layer 1245.

Waveguide 1250 is etched using lithography and dry etching, in an embodiment of the invention. Semiconductor layer 1260 may be formed on top of waveguide 1250, in an embodiment of the invention. Semiconductor layer 1260, in an embodiment of the invention, may reduce the light scattering losses from optically active layer 1230.

Figure 13:
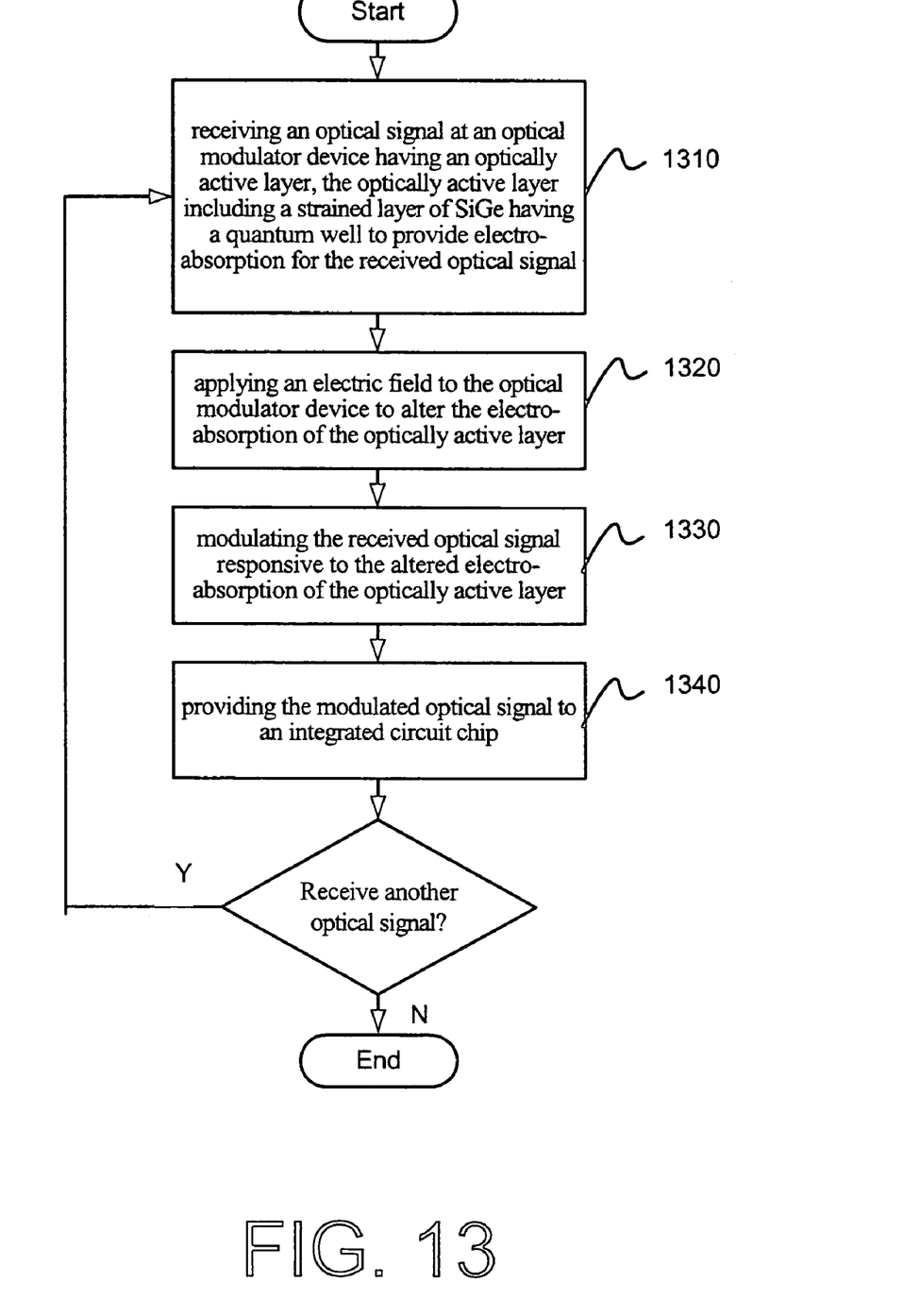
FIG. 13 is a flow diagram illustrating certain aspects of processing an optical signal, according to an embodiment of the invention.

FIG. 13 is a flow diagram illustrating certain aspects of processing an optical signal, according to an embodiment of the invention. Referring to process block 1310, an optical modulator device having one or more strained layers of SiGe doped with, for example, arsenic receives an optical signal. The optical signal may be from an on-chip or an off-chip light source (e.g., a laser or an LED). In an embodiment, the one or more strained layers of SiGe doped with arsenic absorb at least a fraction of the received optical signal in a quantum well. The one or more strained layers of SiGe doped with arsenic may be referred to as an optically active layer.

Referring to process block 1320, an electric field is applied to the optical modulator device to alter the electro-absorption of the optically active layer. As the electro-absorption of the optically active layer is altered, the optically active layer absorbs more or less of the received optical signal. Thus, the received optical signal is modulated by the altered electro-absorption of the optically active layer as shown by reference numeral 1330. In an embodiment, the modulated optical signal is provided to an integrated circuit (IC) chip, as shown by reference numeral 1340. The IC chip receiving the modulated optical signal may be the same IC chip on which the optical modulator device is fabricated.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An optical modulator device comprising:
   a substrate formed from a semiconductor material;
   an optically active layer formed on an upper surface of the substrate, the optically active layer including a layer of SiGe having a quantum well to provide electro-absorption of light in the optically active layer, wherein the layer of SiGe comprises a layer of SiGe nanocrystals;
   a layer of semiconductor material formed on an upper surface of the optically active layer; and
   an electrical contact formed on an upper surface of the layer of semiconductor material to provide an electric field to alter the electro-absorption of light in the optically active layer.

2. The device of claim 1, wherein the layer of SiGe is a strained layer of SiGe having a dopant to provide electrons in the strained layer of SiGe.

3. The device of claim 2, wherein the dopant is at least one of arsenic, phosphorus, and antimony.

4. The device of claim 2, wherein the strained layer of SiGe is between 20 and 70 percent Germanium.

5. The device of claim 4, wherein the strained layer of SiGe is 27 percent Germanium.

6. The device of claim 2, wherein the substrate is formed from silicon.

7. The device of claim 2, further comprising:
   a second layer of semiconductor material formed on an upper surface of the substrate; and
   wherein the optically active layer is formed on an upper surface of the second layer of semiconductor material.

8. The device of claim 7, wherein the second layer of semiconductor material is formed from silicon.

9. The device of claim 2, wherein the optically active layer further comprises:
   a layer of semiconductor material formed on an upper surface of the strained layer of SiGe; and
   a second strained layer of SiGe formed on an upper surface of the semiconductor layer to provide a second quantum well, wherein the second strained layer of SiGe is doped with arsenic.

10. The device of claim 9, wherein a ratio of silicon to germanium in the strained layer is different than a ratio of silicon to germanium in the second strained layer.

11. The device of claim 1, wherein the optical modulator is an optical waveguide modulator.

12. The device of claim 11, further comprising an optical cavity in optical communication with the optically active layer.

13. The device of claim 1, wherein the layer of SiGe has a thickness between five and thirty nanometer.

14. The device of claim 1, wherein the substrate is formed from germanium.

15. An integrated circuit comprising:
   a substrate formed from a semiconductor material;
   an optical modulator with an optically active layer formed on the semiconductor substrate, the optically active layer including a strained layer of SiGe having a quantum well to provide electro-absorption of light, wherein the strained layer of SiGe is doped with at least one of arsenic, phosphorus, and antimony; and
   an optical fiber having a first end in optical communication with the optical modulator.

16. The integrated circuit of claim 15, further comprising a light-emitting source fabricated on the semiconductor substrate to provide an optical signal to the optical modulator.

17. The integrated circuit of claim 16, further comprising a photodetector in optical communication with a second end of the optical fiber to receive light.

18. The integrated circuit of claim 15, wherein the substrate is formed from silicon.

19. The integrated circuit of claim 18, wherein the strained layer of SiGe is between 20 and 70 percent Germanium.

* * * * *